UNITED STATES PATENT OFFICE.

LEONARD PAGET, OF NEW YORK, N. Y., ASSIGNOR TO THE EGYPTIAN LACQUER MANUFACTURING COMPANY, OF NEW JERSEY.

PROCESS OF MAKING PYROXYLINE SOLVENTS.

SPECIFICATION forming part of Letters Patent No. 494,790, dated April 4, 1893.

Application filed February 3, 1893. Serial No. 460,894. (No specimens.)

*To all whom it may concern:*

Be it known that I, LEONARD PAGET, a citizen of the United States, residing in the city, county, and State of New York, have invented certain new and useful Improvements in Processes of Making Pyroxyline Solvents; and I do hereby declare that the following is a full, clear, and exact description of the invention, which will enable others skilled in the art to which it appertains to make and use the same.

Compounds of pyroxyline are solid, liquid, or of an intermediate state. A solid compound is produced by acting upon soluble pyroxyline with the vapor of camphor. In such a compound, the pyroxyline has suffered what is known as "conversion." By conversion is meant that the pyroxyline has lost all structural and cellular form, and has become a homogeneous mass. A liquid compound may be produced by immersion of the pyroxyline in an active liquid solvent; in such a solution of pyroxyline conversion has first occurred and is implied. That conversion has first occurred can be shown by the experiment of treating the pyroxyline with a minimum amount of the active liquid solvent; then evaporation of the excess of solvent, if any, leaves a converted mass that by no known chemical treatment can be brought to the stage preceding conversion. Conversion and solution have therefore sometimes been used as synonymous terms in relation to liquid solvents. Conversion and solution can be produced by a simple solvent substance, such as wood alcohol, when, generally, the solution can be diluted without limit by addition of the same substance. But there are some substances as for instance some essential oils that produce conversion of the pyroxyline and throw out their own excess, that is, no more oil is taken up by the pyroxyline than is necessary to the act of conversion, that of solution in the same oil being refused. Conversion and solution can also be produced by a mixture of substances neither of which is by itself a solvent, as with alcohol and ether; and it may occur, as it does in this case, that dilution of the solution may be made without limit by one of the substances and not by the other, the addition of this other producing precipitation of the converted pyroxyline. Consequently, besides conversion and solution, there must be studied the phenomena of dilution, when an attenuated solution of pyroxyline is desired.

When pyroxyline is converted and dissolved in methyl alcohol, the solution can be diluted to any desired extent with anhydrous ethyl alcohol, but not with anhydrous amyl alcohol, because the latter produces precipitation of the converted pyroxyline at an early stage, which the former does not. In fact where in the art a quick-setting gelatinous, plastic compound is required, a precipitant such as amyl alcohol may be advantageously employed to bring about a solidification and to set free the solvent more quickly. Besides these considerations there are others, especially those relating to degree of volatility, requiring attention when a more or less dilute pyroxyline compound is desired; and this sketch of the state of the art is given in explanation of the object of my invention, which is broadly to extend the list of known solvents and diluents of solvents of pyroxyline. But more specifically the object of my invention is to procure solvents of pyroxyline and diluents of solvents of pyroxyline whose characteristics and properties can be more definitely determined beforehand, or so-to-say, prophetically, than is the case with those hitherto employed in the art. I have discovered such a series of solvents and diluents of solvents of pyroxyline in what are chemically known as the mixed ethers, produced by etherification of mixtures of the primary alcohols under the action of sulphuric acid or its equivalent, by the ordinary process of etherification; and I have found that according to the nature and proportion of the primary alcohols and of the acid taken, so can the resultant mixed ether have certain desired properties not to be obtained by the mixtures of the primary alcohols, but which might be the resultant of the properties of these alcohols taken individually, could such an individual use have been possible. I have also discovered that by distilling again such a mixed ether with acetic, salicylic, or like compounding acid an entirely new series of solvents and diluents of solutions of pyroxyline is obtained, some of which I believe are unknown to modern chemistry.

To carry my invention into effect I produce a mixed ether by distilling a mixture of two or more primary alcohols in the presence of sulphuric acid or its equivalent, and I submit this mixed ether so obtained to redistillation with glacial acetic acid, or with a mixture of sulphuric and salicylic acids. This resulting distillate collected at the boiling point of the mixture is a powerful solvent or useful diluent of a solution, of pyroxyline. For instance, I submit a mixture of twenty-five parts of sulphuric acid, by weight, twenty-five parts of fusel oil, fifteen parts of wood alcohol, and ten parts of grain alcohol, to distillation; and I next submit the distillate to redistillation with fifteen per cent of its volume or less of glacial acetic acid. The resulting distillate of the redistillation is a powerful solvent of pyroxyline of rather high volatility. I have produced a large number of substances in this manner, and all these that are solvent of pyroxyline are diluent of their own solutions, and appear to be diluent to other solutions as far as I have been able to ascertain.

Having fully described my invention, what I claim, and desire to secure by Letters Patent, is—

1. The process of making a solvent of pyroxyline which consists of mixing two or more primary alcohols with sulphuric acid, distilling the mixture and mixing the distillate with an acid which will combine with the ether or ethers so formed and redistilling the mixture.

2. The process of making a solvent of pyroxyline which consists of mixing together two or more primary alcohols with sulphuric acid, distilling the mixture, mixing the distillate with acetic acid, and redistilling.

LEONARD PAGET.

Witnesses:
J. N. BROWN,
E. L. PAGET.